Aug. 12, 1969    J. C. JOHNSON, JR., ET AL    3,460,397
MECHANICAL ACTUATOR

Filed Oct. 2, 1967    3 Sheets-Sheet 1

INVENTORS
John C. Johnson, Jr.
Jesse M. Madey
Xopher W. Moyer &
Dennis K. McCarthy

BY

Carl Lenz ATTORNEYS

INVENTORS
John C. Johnson, Jr.
Jesse M. Madey
Xopher W. Moyer &
Dennis K. McCarthy

BY

ATTORNEYS 3,460,397
MECHANICAL ACTUATOR
John C. Johnson, Jr., Rockville, Jesse M. Madey, Hyattsville, Xopher W. Moyer, Lanham, and Dennis K. McCarthy, Laurel, Md., assignors to the United States of America as represented by the Administrator of the National Aeronautics and Space Administration
Filed Oct. 2, 1967, Ser. No. 672,383
Int. Cl. F16h 21/54, 25/18
U.S. Cl. 74—100                 12 Claims

ABSTRACT OF THE DISCLOSURE

This invention is a mechanical actuator wherein linear motion is changed to rotational motion. A plunger is rectilinearly moved by a suitable expansion and contraction means. Operably connected to one end of the plunger is a rocking beam attached to a shaft. The shaft rotates in one direction or the other depending upon the position of the rocking beam and the position of the rocking beam is determined by the position of the plunger. In addition, an over center spring system is connected to the rocking beam so that a housing can be rapidly moved from one extreme position to an opposite extreme position.

---

The invention described herein was made by employees of the United States Government and may be manufactured and used by or for the Government for governmental purposes without the payment of any royalties thereon or therefor.

Background of the invention

A mechanical actuator is a device wherein a mechanical motion is created and used to actuate a mechanical, electromechanical or other similar type of apparatus. The mechanical motion may be a rotary movement, a rectilinear movement or any other regular movement. Some prior art devices that create mechanical motion are bimetallic elements, motors, and solenoids. One type of solenoid moves in a rectilinear fashion depending upon the energization of the solenoid's coil. Other types of solenoids undergo rotary motion. Similarly, a motor moves in a rotary fashion depending upon the energy applied to the motor. A bimetallic element moves in various fashions depending upon the elements used and the manner of construction.

While the prior art devices for creating mechanical motion have found widespread use, they have not been satisfactory in all environments. Specifically, they generally are environment temperature limited and they have low mechanical output-to-weight ratios. In addition, they are magnetic and in some environments magnetic mechanical actuators cannot be used. Further, some of them will not operate in a vacuum.

One environment where prior art mechanical actuators have been found to be inoperative is in a space vehicle. There are many mechanical operations which must be performed on a spacecraft, such as rotating environment sensors and closing and opening covers to the sensors, for example. In addition, some spacecraft control mechanisms require similar mechanical actuation. Prior art actuators, for one reason or another, are not satisfactory for use on a spacecraft. For example, if the actuator has a magnetometer connected to its operative element, the actuator cannot be permitted to generate a magnetic field because the field would destroy the meaning of the magnetometer's reading. Hence, the actuator must be non-magnetic. Further, because the temperature differential in a spacecraft varies from a "hot" extreme to a "cold" extreme, temperature sensitive mechanical actuators will not operate. In addition, because of the vacuum of space, vacuum sensitive mechanical actuators are inoperative.

Therefore, it is an object of this invention to provide a new and improved mechanical actuator.

It is also an object of this invention to provide a new and improved mechanical actuator that will operate under varying temperature conditions and in a vacuum.

It is still another object of this invention to provide a new and improved oscillating actuator having a high mechanical output-to-weight ratio.

It is still another object of this invention to provide a new and improved mechanical actuator that is non-magnetic and will operate over an extended period of time in an extreme environment.

Summary of the invention

In accordance with a principle of this invention, a plunger is connected at one end to an expansion and contraction means. The expansion and contraction means moves the plunger in a rectilinear manner. A rocking beam is connected to the other end of the plunger and moves from one extreme position to a second extreme position as the plunger moves from a retracted to an extended position. A shaft attached to the rocking beam rotates with the beam to create the actuating movement.

In accordance with a further principle of this invention, an over center spring means is attached to the rocking beam to create a rapid movement from one extreme position to the opposite extreme position.

In accordance with a still further principle of this invention, a means is provided for maintaining the plunger in an extended position.

In accordance with yet another principle of this invention, a spring menas is provided for "setting up" the actuator when the plunger is retracted so that the rocking beam moves to its opposite extreme position when the plunger is extended.

In accordance with still another principle of this invention, microswitch means are provided to cause a continuous oscillating motion of the actuator.

It will be appreciated by those skilled in the art and others that the provision of a plunger connected to an expansion and contraction means in combination with a rocking beam results in a mechanical actuator that will operate under varying environmental conditions. The addition of an over center spring system allows the actuator to move rapidly from one extreme position to a second extreme position. In addition, the inclusion of a spring means allows the actuator to be set up prior to moving the rocking beam from one position to a second position. The inclusion of microswitch means allows the actuator to oscillate.

Brief description of the drawings

The foregoing objects and many of the attendant advantages of this invention will become better appreciated from the following detailed description when taken in conjunction with the accompanying drawings wherein.

Description of the preferred embodiments

Figure 2:
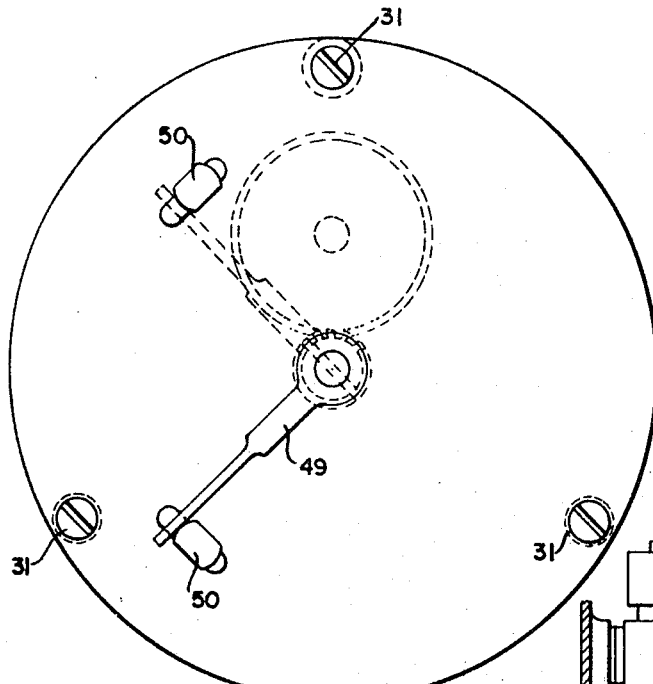
FIG. 2 is a front view of the embodiment of the invention illustrated in FIG. 1.
Figure 3:
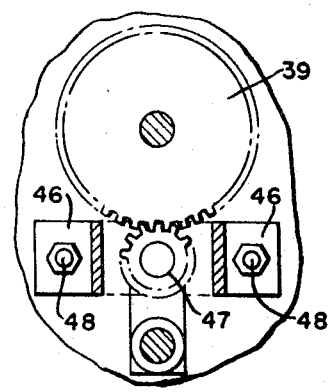
FIG. 3 is a cross-sectional view along line 3—3 of FIG. 1.

The embodiment of this invention illustrated in FIGS. 1–7 generally comprises a housing 11, an expansion and contraction means 13, a plunger 15, a rocking beam 17, and an over center spring means 19.

The housing comprises a front plate 21 and a back plate 23 formed of sheets of a non-magnetic material such as aluminum, for example. An upper tubular member 25 having an aperture 27 along its longitudinal length and a pair of lower tubular members 29 fixedly retain the front and back plates in a parallel arrangement. The tubular members are attached to the plates by screws 31, for example.

A rocking beam shaft 33 has a pair of downwardly extending ears 34 (FIGS. 4 and 5) for retaining an end of the plunger and is journalled in a front hub 35 located on the inner surface of the front plate 21. The rocking beam shaft 33 is also journalled in a back hub 37 located on the inner side of the back plate 23, The rocking beam 17 is fixedly attached to the rocking beam shaft 33 at a point directly beneath the aperture 27 in the upper tubular member 15. A large gear 39 is fixedly attached to the rocking beam shaft 33 at a point adjacent the front hub 35. In addition, a spring retaining element 41 is also mounted on the rocking beam shaft at a point near to, but separated from, the inner side of the large gear 39.

An actuator shaft 43 passes through the front plate 21 and is rotatably mounted in a hub mounted in the front plate 21. In addition, a U-shaped member 45 having an outwardly projecting pair of flanges 46, best illustrated in FIG. 3, retains the inner end of the actuator shaft 43. More specifically, the flanges abut the surface of the inner side of the front plate 21 at a point adjacent to the hub of the actuator shaft. The flanges are fixedly attached to the front plate by a pair of bolts 48, for example. The inner end of the actuator shaft is suitably journalled in an aperture in the cross element of the U-shaped member 45. A small spur gear 47 is mounted on the actuator shaft 43 inside of the U-shaped member 45. The small gear 47 co-acts with the large gear 39 so that when the large gear revolves, the small gear also revolves. Attached to the outer side of the actuator shaft 43 is an actuating arm 49, best illustrated in FIG. 2. A pair of stops 50 are also illustrated in FIG. 2 at the opposite extremes of movement of the actuating arm.

Figure 6:
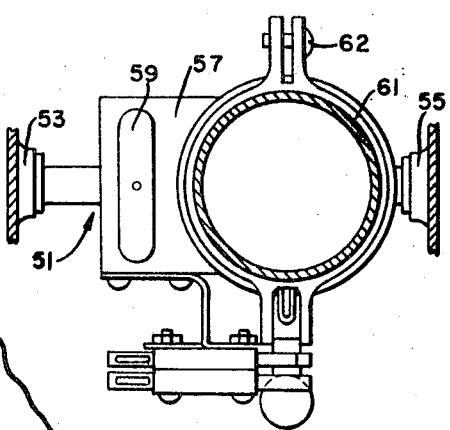
FIG. 6 is a cross-sectional view along line 6—6 of FIG. 1.

Also included in the apparatus is an arm mechanism 51, best illustrated in FIG. 6. The arm mechanism has cylindrical ends similar to shaft ends. One end of the arm mechanism is journalled in a front hub 53 located on the inner side of the front plate 21. The other cylindrical end of the arm mechanism is journalled in a back hub 55 located on the inner surface of the back plate 23. The portion of the arm mechanism between the cylindrical ends comprises a flat region 57 having a front section of the approximate thickness of the cylindrical ends and a rear section slightly thicker than the cylindrical ends. The front section is considerably wider than the cylindrical ends and contains a relatively long aperture 59. The long aperture has semicircular ends and a longitudinal axis that is at a right angle to the axis between the cylindrical ends.

The rear section of the arm mechanism 51 contains a circular aperture 61 located directly beneath the rocking beam. The expansion and contraction means is mounted in the aperture 61 and retained by a retaining means 62 so that the plunger is located beneath the rocking beam for coaction therewith.

Figure 5:
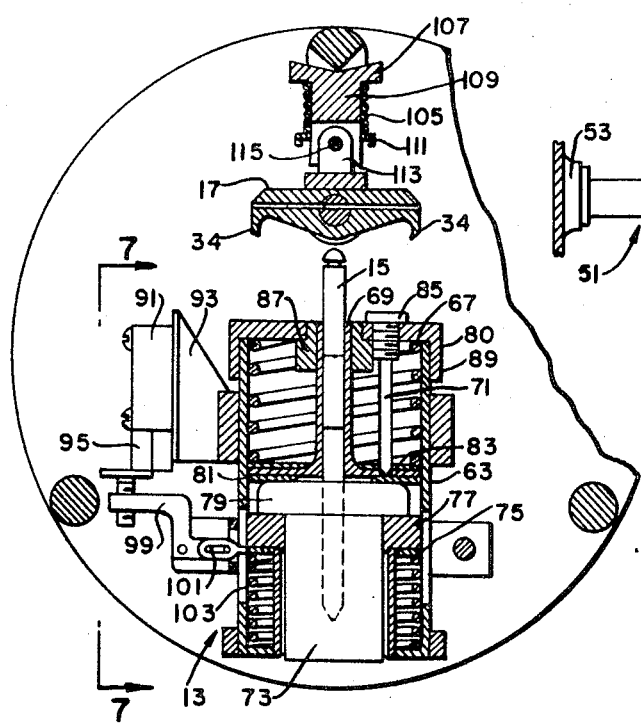
FIG. 5 is a cross-sectional view along line 5—5 of FIG. 1.

The expansion and contraction means 13 is best illustrated in FIG. 5 and comprises a tubular housing 63, a housing element 75, a coil spring 67, a tubular element with a washer-shaped end 69 fixedly attached to the plunger 15, an adjustable stop pin 71, and an expansion and contraction element 73.

The expansion and contraction element 73 is cylindrically shaped with a protruding lip 79 located at one end. A retaining ring 77 is mounted slightly below the center of the housing 63 with the outer periphery pressing against the inside of the housing. The expansion and contraction element passes through the aperture in the retaining ring and the lip of the element presses against the upper side of the ring as viewed in FIG. 5.

The housing 63 has a cup-shaped bottom with an aperture and, the expansion and contraction element 73 passes through the aperture. The heating element 75 fits in the cup-shaped bottom about the expansion and contraction element.

The plunger 15 extends upwardly from the expansion element 73 through a cap 80 mounted over the upper end of the housing 63. The tubular member with the washer-shaped end 69 is mounted over the plunger 15 and fixedly attached thereto by any suitable means. The washer-shaped end is located at the lower end of the structure, as viewed in FIG. 5. A first washer 81 is mounted beneath the washer-shaped end of the tubular member and a second washer 83 is mounted above the washer-shaped end.

The adjustable stop pin 71 is fixedly attached to the cap 80 by a cap screw 85, for example, and passes through apertures in the second washer and the washer-shaped end of the tubular member 69. Hence, as the tubular member 69 and the second washer 83 move in a longitudinal direction, the pin 71 maintains alignment.

In addition, a ring-shaped member with a lip 87 is mounted around the tubular end of the tubular member 69 and fixedly attached to the cap 80. Hence, in the operation as hereinafter described, when the plunger 15 is moved upwardly as viewed in FIG. 5, the tubular member with the washer-shaped end also moves upwardly through the ring-shaped member 87. The coil spring 67 is mounted about the tubular member between the cap 80 and the second washer and is compressed when the tubular member moves upwardly.

At this point it should be noted that there is a slight separation 89 between the lower edge of the cap 80 and the circular aperture in the arm mechanism through which the tubular housing 63 of the expansion and contraction means 13 is mounted. It should also be noted that the retaining means 62 (FIG. 6) of the arm mechanism slidably retains the tubular housing 63 inside of the circular aperture.

Figure 7:
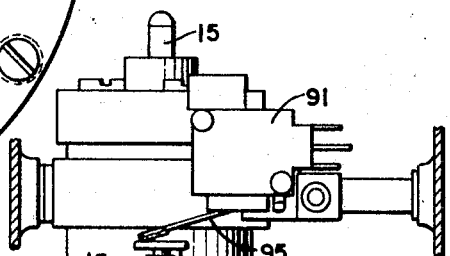
FIG. 7 is a view along line 7—7 of FIG. 5.

In addition to the expansion and contraction member, FIG. 5 illustrates a microswitch 91 attached by a suitable mounting means 93 to the portion of the arm mechanism through which the expansion and contraction means 13 is mounted. The operating arm 95 of the microswitch impinges on an element 97 which is threadably adjustable within an arm 99 (FIGS. 5 and 7). The arm is in turn attached to an inwardly and outwardly movable member 101. The movable member 101 projects inwardly through an aperture 103 in the tubular housing of the expansion and contraction means 13 and is electrically connected to the heating element 75 when the tubular member is in the position illustrated in FIG. 5. However, if the tubular housing is moved downwardly against the coil spring 67 so that the cap 80 closes the gap 89, the movable member 101 becomes detached from the heating element 75. The reason for this operation will be hereinafter described.

The expansion and contraction element 73 may have numerous configurations. For example, the container of the expansion and contraction element 73 could contain paraffin. When the heating element 75 is energized, the paraffin changes from a solid state to a liquid state thereby creating a pressure on the lower end of the plunger 15. This pressure raises the plunger 15 to create the action hereinafter described. Or, the element 73 could be a bellows. When the bellows is heated by the heating element 75, the gases in the bellows expand to create the resultant pressure on the plunger 15. Hence, the expansion and contraction element 73 could have numerous configurations as will be appreciated by those skilled in the art.

Figure 4A:
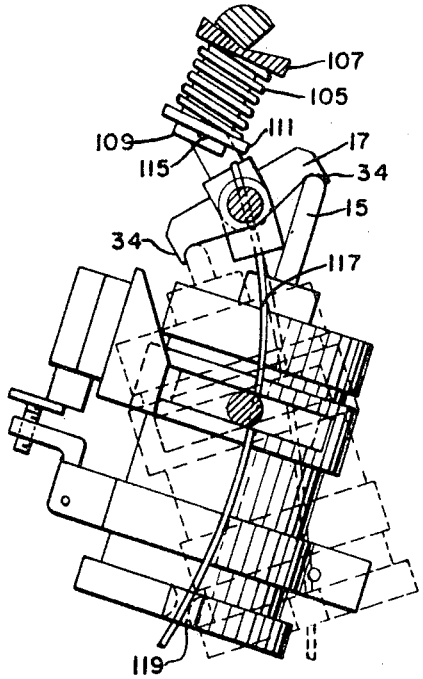
FIGS. 4A and 4B are partial cross-sectional views along line 4—4 of FIG. 1 that illustrate the operation of the invention.
Figure 4B:
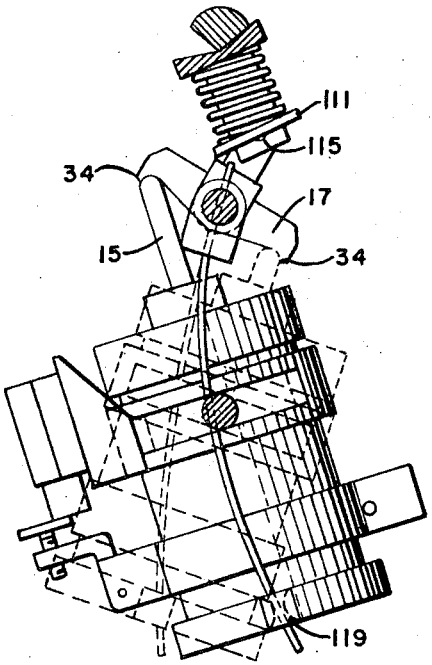

The over center spring means 19 is best illustrated in FIGS. 4A, 4B and 5 and generally comprises a coil spring 105, an overcenter plate 107 having a downwardly projecting member 109, and a washer 111. The coil spring 105 is mounted over the downwardly projecting member 109 and is pressed against the lower surface of the over center plate 107 by the washer 111. The washer is held in place by a pin 115. The over center plate is mounted in the aperture 27 of the upper tubular connecting member (FIG. 1) and, as viewed in FIG. 5, has a slightly V-shaped upper surface that cooperates with a downwardly projecting knife edge formed in the aperture 27 of the upper tubular connecting member 25. The over center plate is retained in the aperture by a pair of L-shaped members 112 fixedly attached to the upper tubular member and projecting beneath the aperture.

Two ears 113 (FIG. 5) extend upwardly from the rocking beam and are rotatably connected to the downwardly projecting member 109 by the pin 115. By this arrangement, as viewed in FIGS. 4A and 4B and hereinafter described, the over center member can move from one off center position to an opposing off center position.

Figure 1:
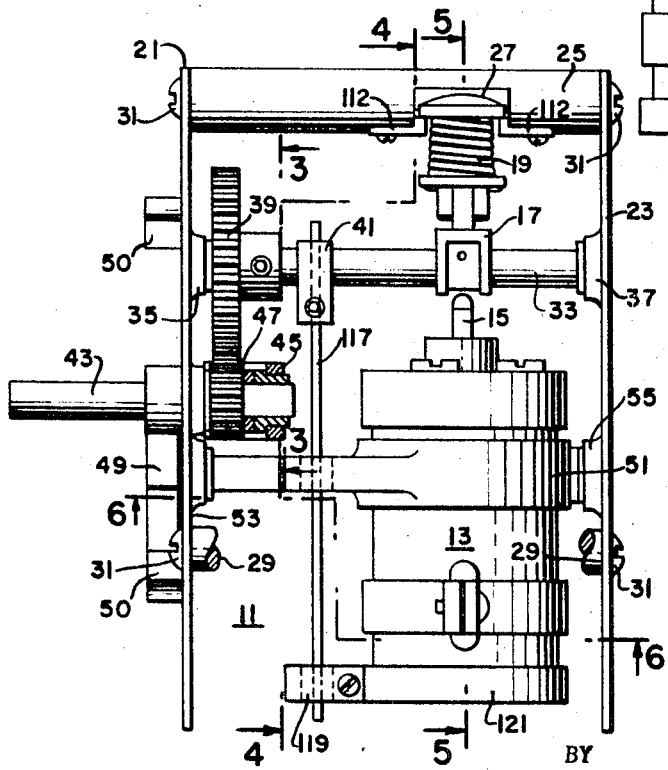
FIG. 1 is a side view of one embodiment of the invention.

In addition to the foregoing components, FIG. 1 also illustrates a round spring wire 117 that projects downwardly from the spring retaining member 41 mounted on the walking beam shaft 33. The middle of the spring 117 passes through the relatively long aperture 59 in the arm mechanism 51. The lower end of the spring 117 passes through a small aperture 119 located in a ring 121 clamped around the lower periphery of the housing 63 of the expansion and contraction means 13.

Turning now to the operation of the embodiment of the invention illustrated in FIGS. 1–7, initially assume that the heating element 75 is unenergized and that the coil spring 67 forces the plunger 15 to its lowest position due to the pressure of the coil 67 against the second washer 83. When the plunger 15 is in its lowest position, the rocking beam will be in one of the dotted positions illustrated in FIGS. 4A and 4B. The exact position of the rocking beam depends upon the previous operation of the device, however, for purposes of description assume that the rocking beam 17 is initially in the position illustrated in FIG. 4A. Assume that power is now applied to the heating element 75 through the microswitch 91.

As the heating element becomes energized, the expansion and contraction element 73 is heated. Assuming this element is filled with paraffin, the paraffin changes from a solid to a liquid state. This liquid state increases the pressure inside of the expansion and contraction element and, hence, the pressure on the lower end of the plunger 15 is increased. As the pressure on the lower end of the plunger 15 increases, the plunger and its attached tubular element 69 are forced against the coil spring 67. As this force increases, the spring is compressed and the plunger is withdrawn from the housing 63. As the plunger starts to extend upwardly from the dotted position of FIG. 4A, it applies pressure to the left side of rocking beam 17. When sufficient pressure is applied to the left side of the rocking beam 17 to overcome the force of the coil spring 105, the device snaps to its opposite position as illustrated by the solid lines of FIG. 4B.

If the heating element is now allowed to cool down, the plunger 15 withdraws into the expansion and contraction means 13. However, the rocking beam does not drop back to the dotted position illustrated in FIG. 4A, rather, the round spring 117 moves the housing 63 of the expansion and contraction means 13 to the dotted position of FIG. 4B. Thereafter, if the heating element 75 is again energized, the plunger will extend to the solid position of FIG. 4A. At some point in this extension, depending upon the exact spring constants used, the rocking beam will snap to the solid position illustrated in FIG. 4A. Hence, by heating and cooling the element 75, the plunger is extended and withdrawn and the mechanical actuator arm 49 cyclically moves from a first position to a second position. Specifically, the arm 49 illustrated in FIG. 2 moves from the solid stopped position to the dotted stopped position and vice versa if the gear ratio between the large and small gears is such as to cause the indicated 90° movement.

Because in some environments it may be desirable to maintain one position for a period of time, the microswitch 91 is provided to restrict the length of the stroke by turning off the heating element. That is, because the liquid will continue to expand if the element 75 is maintained heated until an undesirable amount of pressure is applied by the plunger against the rocking beam 17, a means must be provided to "turn off" the heating element when the plunger has reached a fully extended position. But, if the extended position of the plunger is to be maintained, the heating element 75 must be re-energized when the plunger starts to retract. The microswitch 91 in combination with the inwardly and outwardly movable member 101 and their connecting elements provide this result. Specifically, when the plunger is fully extended, it creates a spring pressure against the second washer 83. If further pressure is applied to the plunger 15, the expansion and contraction element 73 moves downwardly against the spring member because the plunger cannot extend further. This then is the reason for slidably holding the element 73 in the aperture 61 of the arm mechanism 51. As the element 73 moves downwardly, the heating element 75 is moved out of contact with the inwardly and outwardly movable element 101 and is de-energized.

Now, prior to the plunger starting to withdraw into the expansion and contraction element 63 because the liquid cools, the spring moves the element 73 upwardly and opens the gap 89. When the element 73 moves upwardly, the inwardly and outwardly movable member again comes into contact with the heating element 75. This contact reapplies heat to the expansion and contraction element 73 and causes the plunger to again move outwardly if it has moved inwardly. Hence, this simple switching device allows the plunger to be maintained in the extended position, but prevents an overpressure condition which could result in the destruction of the device.

Figure 8:
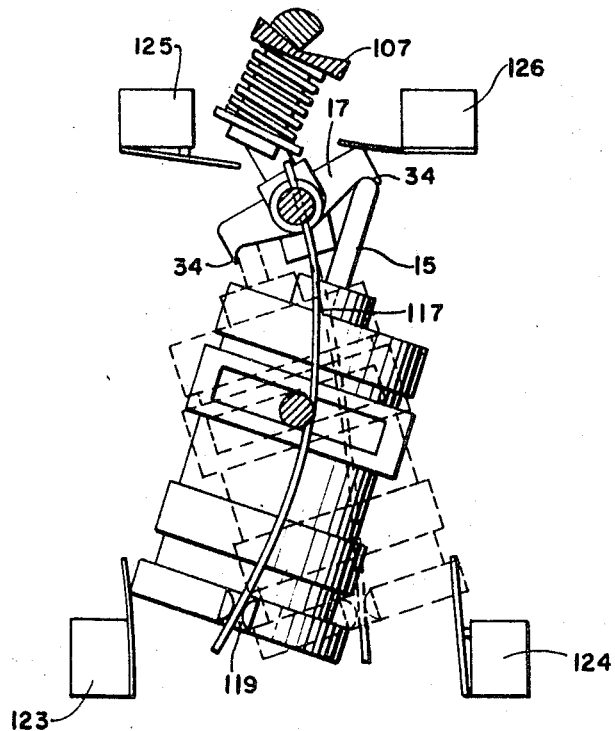
FIG. 8 is a side view of a portion of an alternate embodiment of the invention that is adapted to oscillate.
Figure 9:
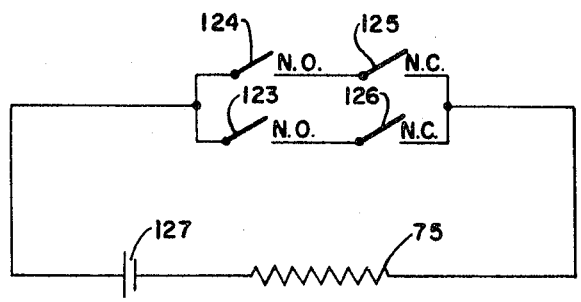
FIG. 9 is a schematic diagram of a control circuit for the embodiment illustrated in FIG. 8.

While the embodiment of the invention illustrated in FIGS. 1–7 is suitable for use in an environment wherein it is desired to switch a mechanical actuator arm 49 from one position to a second position in accordance with a control signal, it may also be desirable to provide a mechanical actuator that automatically oscillates from the first position to the second position. FIG. 8 illustrates a modification of the embodiment of the invention illustrated in FIGS. 1–7 that performs such a function. FIG. 9 is a schematic diagram of a circuit for controlling the oscillating movement of the modification illustrated in FIG. 8.

Specifically, FIG. 8 is generally similar to FIG. 4A with the elimination of the microswitch 93 and its attachments to the heating element. Although not illustrated, a fixed connection to the heating element replaces the microswitch. In addition, four microswitches are illustrated in FIG. 8. Two lower microswitches 123 and 124 are illustrated as mounted, by means not shown, so that they are actuated by the ring 121 located around the lower periphery of the expansion and contraction means 13. That is, when the expansion and contraction means is in one extreme position, it operates one of the microswitches and when it is in the opposite extreme position it operates the second microswitch.

A second pair of microswitches 125 and 126 are also illustrated in FIG. 8. These switches are mounted above the ends of the rocking beam 17 and are operated by the rocking beam when it is in one or the other of its extreme positions. The third and fourth microswitches are also suitably mounted by means not shown.

FIG. 9 schematically illustrates the four microswitches, a battery 127 and the heating element 75. The microswitches are connected in a parallel arrangement. The upper left hand microswitch 125 is connected in series with the lower right hand microswitch 124, and the lower left hand microswitch 123 is connected in series with the upper right hand microswitch 126. The series circuits are connected in parallel and the parallel arrangement is connected in series with the battery 127 and the heating element. The lower microswitches 123 and 124 are normally open and the upper microswitches 125 and 126 are normally closed.

Turning now to the operation of the embodiment of the invention illustrated in FIGS. 8 and 9, initially assume that the plunger is extended in the solid position illustrated in FIG. 8. At this point, the first microswitch 123 is closed because it is contacted by the ring 121, and the fourth microswitch 126 is open because it is contacted by one side of the rocking beam 17. Since microswitch 126 is open, no current can flow through the first and fourth microswitch branch of the parallel combination. In addition, the third microswitch 125 is closed because it is not contacted and the second microswitch 124 is open because it is not contacted. Since the second microswitch 124 is open, no current can flow through the second and third microswitch branch of the parallel combination. Hence, at this point no current is passing through the heating element 75 because both branches of the parallel combination are open.

Because no power is being applied to the heating element, the expansion and contraction means cools and the plunger is withdrawn. As the plunger withdraws, the round spring 117 moves the expansion and contraction means to the dotted position of FIG. 8. When the expansion and contraction means reaches the dotted position, the switches assume the following conditions: the first switch 123 is open because it is uncontacted by the ring; the second switch 124 is closed because it is contacted by the ring; the third switch 125 is closed because it is uncontacted, and the fourth microswitch 126 is open because it is being contacted by the end of the rocking beam arm 17.

Because the second and third microswitches 124 and 125 are now closed a completed circuit for applying power to the heating element 75 is created. Application of heat to the heating element causes the plunger to extend and move the rocking beam toward the third microswitch 125. When the plunger causes the rocking beam arm to reach the third microswitch 125, it opens that microswitch. Opening the third microswitch 125 cuts power from the heating element 75 and the expansion and contraction means move to the solid position of FIG. 8 with the plunger withdrawn. Thereafter, the first microswitch 123 is closed as is the fourth microswitch 126 and the plunger is again extended to reach the extended solid position in FIG. 8. At this point power is again cut off by opening the fourth microswitch 126 and the expansion and contraction means returns to the dotted position of FIG. 8. Hence, it will be appreciated that this four microswitch system provides a completely oscillatory movement. That is, the rocking beam 17 moves from one extreme position to the second extreme position in an oscillating manner. This causes the actuating arm 49 to oscillate between its two extreme positions.

While the hereinabove described invention has been described for use on a spacecraft, it will be appreciated by those skilled in the art and others that the invention has broader application. Specifically, it can be utilized in any environment where it is desired to create a mechanical motion of the type described. This motion can be controlled or, it can be oscillatory as illustrated in the embodiment of FIGS. 8 and 9.

It will also be appreciated that while the actuator arm 49 is illustrated as only moving 90°, this is merely by way of example. The gear ratios between the large and small gears can be varied such that a 360°, 180° or any angular degree movement can be created. Hence, the invention can be practiced otherwise than as specifically described herein.

What is claimed is:
1. A mechanical actuator comprising:
   an actuator housing;
   an expansion and contraction means for creating a rectilinear movement rotatably mounted in said housing, said expansion and contraction means including a rectilinearly movable plunger, an arm mechanism having cylindrical ends journalled in a pair of opposing sides of said actuator housing, said arm mechanism having an aperture therein, and an expansion and contraction element mounted in said aperture, wherein said plunger extends from and withdraws into said expansion and contraction element;
   a rocking beam means rotatably mounted in said housing and operatively connected to said plunger from transposing the rectilinear motion of said plunger into rotary motion; and
   actuator arm means operatively connected to said rocking beam means for creating a rotary actuating movement from one position to a second position.

2. A mechanical actuator as claimed in claim 1 wherein said rocking beam means comprises:
   a shaft also journalled in said opposing walls of said actuator housing; and
   a rocking beam mounted on said shaft and rotatable with said shaft.

3. A mechanical actuator as claimed in claim 2 wherein said actuator arm means comprises:
   a shaft suitably journalled through one wall of said housing;
   a first gear mounted on said rocking beam shaft; and
   a second gear mounted on said actuator arm shaft and operatively connected to said first gear.

4. A mechanical actuator as claimed in claim 3 including an over center spring means operatively connected to said rocking beam for rapidly moving said rocking beam from a first position to a second position as said plunger of said expansion and contraction means expands and withdraws.

5. A mechanical actuator as claimed in claim 4 wherein said expansion and contraction element comprises:
   a tubular housing member having an expansion and contraction device operatively connected to said plunger for moving said plunger when heat is applied to said expansion and contraction device.

6. A mechanical actuator as claimed in claim 5 wherein said expansion and contraction device is heated by a heating element contained in said device.

7. A mechanical actuator as claimed in claim 6 wherein said expansion and contraction element also includes a coil spring mounted in said housing and operatively connected to said plunger so that said plunger is withdrawn when said coil spring is extended and is extended when said coil spring is compressed, said coil spring being compressed when heat is applied to said heating element.

8. A mechanical actuator as claimed in claim 7 including a leaf spring connected to said shaft of said rocking beam means and projecting through said arm mechanism to the housing of said expansion and contraction means.

9. A mechanical actuator as claimed in claim 8 wherein said actuator housing comprises a pair of plates connected by a plurality of tubular members, one of said tubular members having an aperture wherein which said over center spring means is mounted.

10. Apparatus as claimed in claim 9 wherein said aperture in said tubular member has a knife edge that operatively coacts with an element of said over center spring means having a V-shaped head.

11. Apparatus as claimed in claim 10 including microswitch means connected to said heating element for controlling the application of electrical power to said heating element.

12. Apparatus as claimed in claim 10 including means operatively connected to said expansion and contraction means to cause said plunger to extend and withdraw in an oscillating manner.

References Cited

UNITED STATES PATENTS

| | | | |
|---|---|---|---|
| 2,451,449 | 10/1948 | Sacchini | 74—100 |
| 2,468,693 | 4/1949 | Stoecklin et al. | 60—23 |
| 2,569,038 | 9/1951 | Day | 92—118 |
| 2,576,771 | 11/1951 | Bentley | 74—100 |
| 3,184,914 | 5/1965 | Cole | 60—23 |

FRED C. MATTERN, Jr., Primary Examiner

W. S. RATLIFF, Jr., Assistant Examiner

U.S. Cl. X.R.

60—23; 92—118